United States Patent [19] [11] 3,874,837
Jamieson [45] Apr. 1, 1975

[54] DIE FOR EXTRUSION OF FINE GRAINED GREEN CARBON
[75] Inventor: Charles P. Jamieson, Buffalo, N.Y.
[73] Assignee: Airco Inc., New York, N.Y.
[22] Filed: Sept. 18, 1972
[21] Appl. No.: 290,200

[52] U.S. Cl.............................. 425/378, 425/461
[51] Int. Cl.............................................. B29f 3/04
[58] Field of Search ......... 425/461, 466, 467, 376, 425/378, 379, 380, 445; 264/29, 176 R

[56] References Cited
UNITED STATES PATENTS
2,770,841  11/1956  Cooke et al. .................. 425/379 X
3,382,535  5/1968  Ferrari .............................. 425/461
3,666,847  5/1972  Bailey ............................. 425/379 X OTHER PUBLICATIONS
Sortais, H. C. et al., An Optimum Die Profile for Axi-symmetric Extrusion, Int. J. Mach. Tool Des. Res., 8: p. 61-72, July, 1968, TJ1180.A1.

Primary Examiner—R. Spencer Annear
Assistant Examiner—Mark Rosenbaum
Attorney, Agent, or Firm—H. Hume Mathews; Edmund W. Bopp

[57] ABSTRACT

A die for the extrusion of a fine-grained calcine-binder mix to form a green carbon, shaped body. The die profile is optimized according to the criteria that shear be minimized in a perfectly plastic material passed therethrough. A stress relief die extension is fitted to the end of the die for enabling a gradual expansion of the extrudate, and means are provided for cooling the die extension to control the extrudate flow field.

5 Claims, 5 Drawing Figures

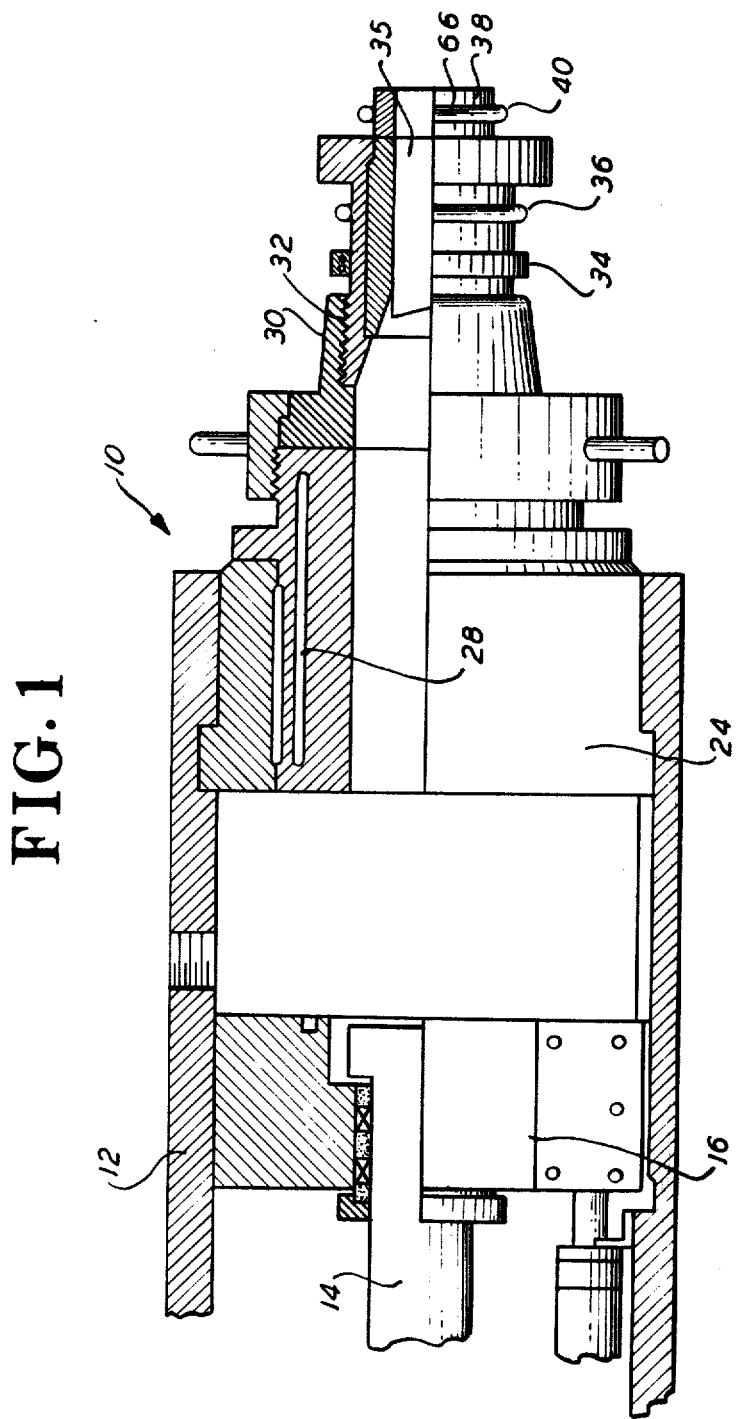

3,874,837

DIE FOR EXTRUSION OF FINE GRAINED GREEN CARBON

BACKGROUND OF INVENTION

This invention relates generally to apparatus and methodology for use in forming green carbon bodies, and more specifically relates to apparatus and methodology for use in forming brush-grade materials from fine-grained mixtures of a calcine with a coal tar pitch binder.

At the present time the most widely used technique for manufacturing brush-grade carbon bodies consists of preparing a fine-grained particulate carbon by calcining a product such as raw lampblack, to eliminate residual tars and oils, mixing the resulting "calcine" (i.e., the product of calcination) with coal tar pitch, extruding this mix, cooling the green material to room temperature, crushing the green material into flour, and finally, molding the flour into blocks which are baked and graphitized. While it has from time to time been proposed that one might extrude mixes of such a calcine and coal tar pitch into plates which could then be immediately baked and graphitized, such techniques have not in the past been particularly successful. Although in principle these techniques would seem highly desirable in that the resultant simplification of processing would vastly reduce costs and improve quality in the ensuing products, prior techniques for extrusion of fine-grained carbon materials have tended to produce "coring" in the extruded bodies. By such term is meant a phenomenon wherein the center of the extrudate tends to advance ahead of the surface layers, with consequent flaws in the formed bodies.

In the paper by H. C. Sortais and S. Kobayashi, "An Optimum Die Profile for Axisymmetric Extrusion", Int. J. Mach. Tool Des. Res., Volume 8, pp. 61–72, Pergamon Press, 1968, the authors have set forth optimum die profiles for the extrusion of a perfectly plastic extrudate with good lubrication of the die surface. The die profiles therein described are such as to minimize the work expended in shearing the extrudate. This optimum die profile might be thought in principle to be serviceable for eliminating coring in the present application. In practice, however, it is found that for extruding fine-grained calcine-pitch mixes the said optimum die profiles actually over-compensate so that the core lags the periphery — a phenomenon which is referred to herein as "anti-coring". This, in turn, can result in unacceptable defects in the resultant materials.

In accordance with the foregoing, it may be regarded as an object of the present invention to provide apparatus and methodology enabling extrusion of mixtures of a fine-grained calcine and coal tar pitch into plates which may be immediately baked and graphitized.

It is a further object of the present invention to provide apparatus and methods, according to which the theoretically optimum die profiles for a perfect plastic material may be utilized in extrusion of fine-grained calcine-coal tar pitch compositions, without introducing over-compensation such that anti-coring effects occur.

SUMMARY OF INVENTION

Now, in accordance with the present invention, the foregoing objects, and others as will become apparent in the course of the ensuing specification, are achieved by the use, firstly, of a die profile which is optimized according to the criteria that shear be minimized in the extrusion of a perfectly plastic material passed therethrough. In order to avoid the defects that frequently occur where the extrudate expands suddenly upon leaving the die, a stress relief die extension is fitted to the end of the die to allow a gradual expansion of the extrudate. In order, furthermore, to eliminate the anti-coring effects that may occur due to the overcompensation of the die profile utilized means are provided for cooling the die extension to thereby control the extrudate flow field. By imposing a desired degree of such cooling, compensation can be introduced which is appropriate to the extrudate being utilized.

BRIEF DESCRIPTION OF DRAWINGS

The invention is diagrammatically illustrated by way of example in the drawings appended hereto in which:

FIG. 1 is a longitudinal schematic cross-section through an extrusion press utilizing the principles of the present invention;

DESCRIPTION OF PREFERRED EMBODIMENT

Figure 2A:
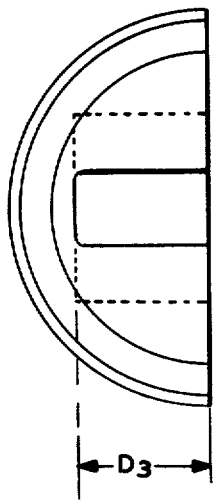
FIGS. 2 and 2A are respectively plan and end views of one-half of the extrusion die utilized in accordance with the invention.

In FIG. 1 herein an extrusion press 10 is set forth by way of highly schematic longitudinal cross-section. The apparatus depicted is in most respects of conventional construction, and therefore is not set forth with more detail than is required to enable a complete understanding of the invention. As thus seen in FIG. 1, press 10 includes a casing 12 in which is mounted a hydraulic driven plunger 14, which reciprocates through bearing block 16 to permit filling of the mudpot 24 with the material to be extruded — which in the present instance may comprise a fine-grained lampblack based brush-grade material. In a typical instance, for example, the mix thus utilized may consist of a blend of lampblack calcine and Allied Chemical Nos. 130 and/or 110 rod pitch, together with quantities of stearic acid. The pitch levels range from about 35 pph to 75 pph, with about 50–55 pph being typical, and the stearic acid, which is added as an extrusion aid and a wetting agent, may have levels ranging from 0 to as high as 10 percent by weight of the composition.

Mudpot 24 containing the said extrudate is surrounded by an oil heating channel 28 and enables the temperature of the extrudate to be maintained according to desired temperatures for processing. In practice, it is found that generally best results are achieved when during extrusion of the calcine and pitch mix, the temperature of the extrusion chamber, mix and the main body of the die are kept at approximately the same temperature.

Toward the forward end of press 10 a die adapter 30 surrounds and holds a die holder 32, which in turn carries the die 35. In order to provide appropriate temperatures for the die an annular electrical heater 34 is provided as well as a flame heater 36. These heaters are controlled, as is known in the art to maintain the selected temperatures. Adjoining the die and at the exit of the press 10, a stress relief section 38 is provided, which is seen to include annular cooling means 40. The latter may, for example, comprise a simple channel through which oil or other liquid coolant may be made to pass. Means 40 is sufficiently close to the adjacent end of die 35, that this exit portion of the die is also cooled by the said means.

Figure 2:
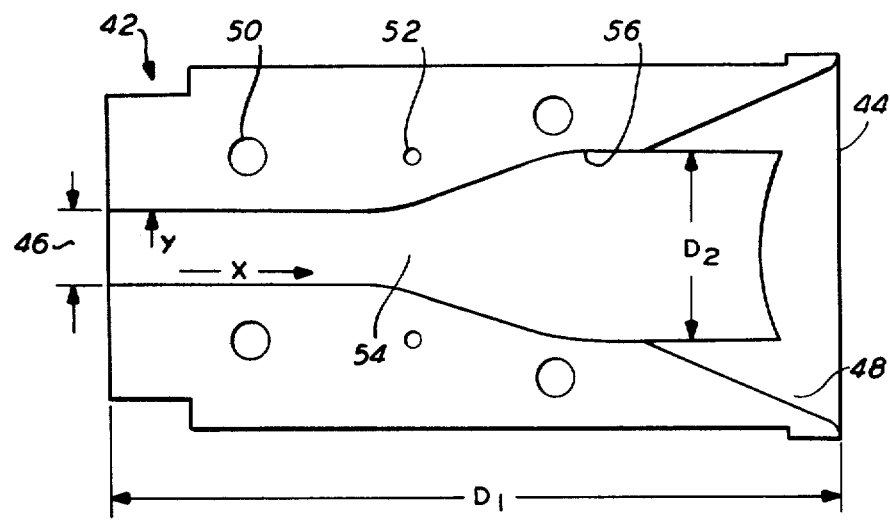

In FIGS. 2 and 2A herein, plan and end views respectively appear of the die half 42, which, in combination with an identical member, may comprise the die 35 of FIG. 1. The die half 42 is seen to include a pair of positioning pins 52, as well as bolt holes 50. During the course of normal use thereof, the two identical halves are bolted together and placed within the die holder 32.

In accordance with the embodiment of the invention illustrated, the extrudate is ultimately formed into a platelike body, which in a typical application (after suitable baking and graphitizing schedule) is cut into individual rectangular-like slabs for use as brush elements. Accordingly, the output from die 35, as seen at end 46, is shaped in a generally rectangular form. At the input end 44 of the die, a conical surface 48 is provided which acts during the first stage of reduction to establish the width of the plate to be extruded. The extrudate thereupon enters the channel 54 wherein during the second stage of reduction, the thickness of the plate is ultimately established.

In accordance with the present invention, the profile of channel 54 is determinatively formed so as to minimize shear in a passing extrudate. Profile 56 is actually designed in accordance with the principles set forth in the Sortais and Kobayashi paper previously referred to. Actual dimensions of the profile in a representative case are illustrated by the table herein set forth wherein the coordinates X and Y are profile coordinates, X being measured from the exit end of the die in inches, and Y being the profile coordinate measured from the centerline in inches: the corresponding values of the marked dimensions $D_1$, $D_2$ and $D_3$ in FIGS. 2 and 2A are respectively $D_1 = 9\ 3/8$ inches, $D_2 = 2.50$ inches and $D_3 = 1.75$ inches.

rials often show chevron-shaped cracks with the points of the chevrons pointing back into the extrusion press. It appears that this result is caused by the periphery of the extrudate tending to move ahead of the core, a phenomenon which may be called "anti-coring". The existence of anti-coring implies that the shear resistance between extrudate and the die surface is less than the shear resistance within the extrudate. This is a result of the extrudate not being the perfectly plastic material assumed in the calculation of the optimum die. In particular, the carbon mixes utilized herein are not perfectly plastic material because particles in the mix impede shearing, especially when the mix is under pressure during extrusion. Accordingly, the optimum die profile actually over-compensates for coring, with particle-containing extrudates. In accordance with the invention the ensuing anti-coring phenomenon is overcome by cooling the end of the die to increase the shear resistance between extrudate and die surface, effectively increasing extrusion pressure.

Figure 3:
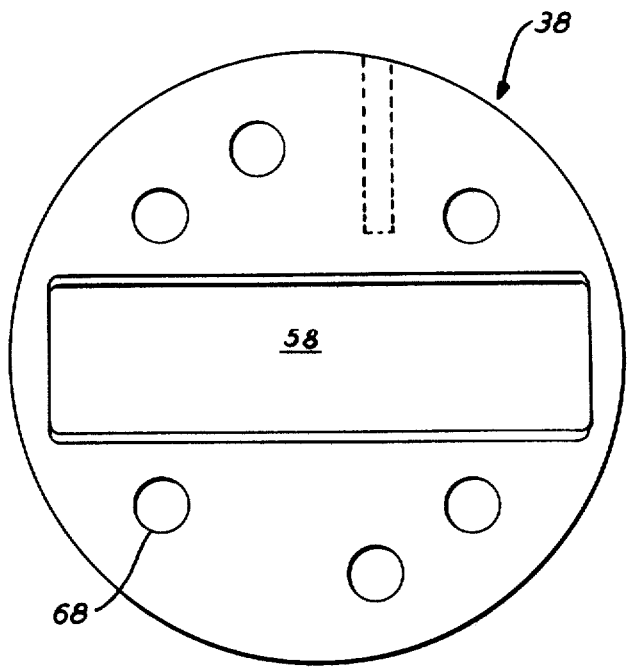
FIGS. 3 and 3A are respectively plan and elevational views of the stress relief section joined to the extrusion die of FIGS. 2 and 2A.
Figure 3A:
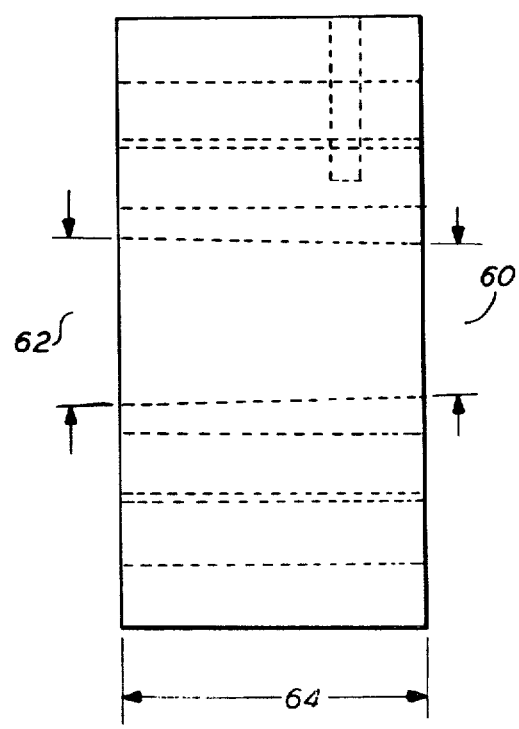

In FIGS. 3 and 3A herein, plan and elevational views respectively appear of the stress relief section 38 previously referred to in connection with FIG. 1. The plan view is taken from the exit end of the apparatus. In considering FIGS. 3 and 3A, it will firstly be noted that the generally rectangular channel 58 provided through section 38 diverges in cross-sectional area toward the direction of progression of the green plate. In a typical instance, for example, the input dimension 60 may have a value of 1.000 inch, whereas the output dimensionn 62 may have a value of 1.026 inches. This diverging cross-section allows the green plate to expand relatively slowly as it passes through the distance 64, representing the length of section 38. In a typical application, for example, the latter distance 64 may be of the order of 2 inches. The width of the opening at the exit

TABLE 1

| X | Y | X | Y | X | Y | X | X |
|---|---|---|---|---|---|---|---|
| 0-3 | 0.5 | 4.0 | 0.756 | 5.00 | 1.118 | 6.0-8.3 | 1.250 |
| 3.25 | 0.520 | 4.25 | 0.875 | 5.25 | 1.163 | | |
| 3.50 | 0.575 | 4.50 | 0.970 | 5.50 | 1.200 | | |
| 3.75 | 0.658 | 4.75 | 1.050 | 5.75 | 1.225 | | |

NOTE: Width of Plate established 7" from die exit.

The profile 56 utilized herein is, as has been previously discussed, designed for extrusion of a perfectly plastic extrudate with good lubrication of the die surface. This optimized die profile is one which minimizes the work done on the extrudate by eliminating the redundant work expended in shearing the extrudate. The deformation of the extrudate closely approximates simple elongation, the condition of minimum work. These optimum die profiles have the interesting characteristic that the radius of curvature at the entrance section of the die is considerably greater than the radius of curvature at the exit end of the die.

It might be expected that an optimum die profile of the above type should serve to eliminate the coring phenomenon, according to which it has previously been found that extruded materials of the present type are defective in consequence of the center of the extrudate advancing more rapidly than layers contained near the walls of the die. Where die profiles as illustrated herein are utilized without further modification, however, it is found that extruded plates of green mateend of the stress relief section is typically determined by measuring the thickness of the expanded green plate extruded without the stress relief section. Holes 68 are provided in section 38 which are threaded at one end, these holes permitting bolting of the section to the die.

In accordance with the principles previously set forth, stress relief section 38, as well as the adjacent end of die 35, are cooled. In a representative instance, the die extension is maintained at a temperature approximately 30°C cooler than the main body of the die, extrusion chamber, etc., the latter elements typically being maintained at about 165° to 170°C. This is accomplished in apparatus 10 by permitting the escape of high pressure carbon dioxide from small holes in a copper tube 66 (FIG. 1) wrapped around the stress relief section. Temperature sensing means together with attendant requisition of the flow and emission of the said carbon dioxide, is automatically controlled by techniques well known in the art, to maintain the selected temperature at section 38. In general, the die extension is maintained at a temperature at least 5°C cooler than the said main die body. It will be appreciated, however, that the actual temperature maintained at section 38, may be appropriately selected in order to achieve a required compensation for a particular extrudate composition and processing conditions (pressure, etc.) utilized. This is an important advantage of the present invention, as compared, for example, to use of an idealized die profile — which necessarily has its particular construction optimized for specific extrudate compositions and flow parameters.

The present invention is applicable to any extrudate consisting of particles in a binder where coring is objectionable. Thus, the invention applies to the extrusion of pieces with other cross-sections than those specifically set forth herein such as, for example, circles, squares and other rectangular forms. Extrusion pressures utilized in the course of the present invention typically are of the order of 1,750 to 3,000 psi. If pressures are too low, the particles will not generally be thoroughly enough bonded together. On the other hand, if pressures are excessive, cracks may occur in later processing.

When materials are processed in accordance with the principles set forth herein, it is found that the ensuing baked and graphitized products have superior mechanical properties, and are markedly free from flaws — particularly of the type heretofore known to be introduced as a result of the coring phenomenon previously discussed.

While the present invention has been particularly set forth in terms of specific embodiments thereof, it will be understood in view of the present disclosure that numerous variations upon the invention are now enabled to those skilled in the art, which variations yet reside within the scope of the instant teaching. Accordingly, the invention is to be broadly construed and limited only by the scope and spirit of the claims now appended hereto.

I claim:

1. In a die for the extrusion of a calcine-binder mix to form a green carbon, shaped extrudate, the improvement wherein: said die includes a channel, the profile of which is converged to satisfy the criteria that shear be minimized for a perfectly plastic material passed therethrough; a stress relief die extension being fitted to the output end of the die and comprising the exit section for said shaped extrudate, said die extension including a second channel diverging slightly in cross-section from the input to output ends of said extension for enabling a constrained gradual expansion of the extrudate to its final expanded thickness, so as to avoid defects generated by sudden expansion of said extrudate; and wherein means are provided for cooling said die extension to control the extrudate flow field.

2. Apparatus in accordance with claim 1, wherein said die is adapted for extrusion of plates having generally rectangular cross-sections, and wherein a first portion of said die toward the input end thereof establishes the width of said plates and a second downstream portion of said die establishes the thickness of said plates.

3. Apparatus in accordance with claim 2, wherein said second portion comprises said converged channel.

4. Apparatus in accordance with claim 3, wherein said second channel is of generally rectangular cross-section.

5. Apparatus in accordance with claim 4, wherein said means for cooling said extension are further adapted to cool adjacent portions of said die.

* * * * *